United States Patent
Leigh et al.

(10) Patent No.: US 10,768,375 B2
(45) Date of Patent: Sep. 8, 2020

(54) ELECTRO-OPTICAL CONNECTORS

(71) Applicant: Hewlett Packard Enterprise Development LP, Houston, TX (US)

(72) Inventors: Kevin B. Leigh, Houston, TX (US); George D. Megason, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 339 days.

(21) Appl. No.: 15/749,170

(22) PCT Filed: Jul. 31, 2015

(86) PCT No.: PCT/US2015/043255
§ 371 (c)(1),
(2) Date: Jan. 31, 2018

(87) PCT Pub. No.: WO2017/023275
PCT Pub. Date: Feb. 9, 2017

(65) Prior Publication Data
US 2020/0088950 A1    Mar. 19, 2020

(51) Int. Cl.
*G02B 6/38*      (2006.01)
*G02B 6/42*      (2006.01)

(52) U.S. Cl.
CPC .......... *G02B 6/3817* (2013.01); *G02B 6/383* (2013.01); *G02B 6/3882* (2013.01); *G02B 6/4293* (2013.01)

(58) Field of Classification Search
None
See application file for complete search history.

(56) References Cited

U.S. PATENT DOCUMENTS

| | | | | |
|---|---|---|---|---|
| 4,869,566 A | * | 9/1989 | Juso | G02B 6/3817 385/53 |
| 5,109,452 A | * | 4/1992 | Selvin | G02B 6/3817 385/56 |
| 6,375,362 B1 | * | 4/2002 | Heiles | G02B 6/3827 385/135 |
| 7,481,584 B2 | | 1/2009 | Cairns | |
| 7,572,063 B2 | | 8/2009 | Mynott | |

(Continued)

FOREIGN PATENT DOCUMENTS

| DE | 102009021175 | | 11/2010 |
|---|---|---|---|
| KR | 10-2010-0053891 | * | 5/2010 |

*Primary Examiner* — Michael Stahl
(74) *Attorney, Agent, or Firm* — Hewlett Packard Enterprise Patent Department

(57) ABSTRACT

An example electro-optical connector may comprise an optical ferrule to optically engage with a complementary optical ferrule on a complementary electro-optical connector, a first conductive guide post disposed adjacent to the optical ferrule to electrically engage with a first guide pocket of the complementary electro-optical connector, and a second conductive guide post disposed on an opposite side of the optical ferrule from the first conductive guide post and to electrically engage with a second guide pocket of the complementary electro-optical connector. The first and second conductive guide posts may align the optical ferrule for engagement with the complementary optical ferrule when the guide posts are engaged with the respective guide pockets, and the first and second conductive guide posts may conduct an electrical signal or electrical power from the electro-optical connector to the complementary electro-optical connector.

9 Claims, 6 Drawing Sheets

(56) References Cited

U.S. PATENT DOCUMENTS

| | | |
|---|---|---|
| 8,202,012 B2 | 6/2012 | Stewart |
| 8,714,836 B2 | 5/2014 | Daikuhara |
| 8,974,126 B2 | 3/2015 | Sloey |
| 2002/0161421 A1 | 10/2002 | Lee |
| 2002/0164899 A1 | 11/2002 | Nakura |
| 2008/0205816 A1 | 8/2008 | Lu |
| 2011/0008004 A1 | 1/2011 | Liao |
| 2011/0116750 A1* | 5/2011 | Terlizzi ............... G02B 6/3817 385/88 |
| 2011/0249943 A1* | 10/2011 | Case .................... G02B 6/3885 385/59 |
| 2012/0082421 A1 | 4/2012 | Hsu |
| 2015/0110444 A1* | 4/2015 | Tanaka ................ G02B 6/3817 385/75 |
| 2016/0091673 A1* | 3/2016 | Good .................. G02B 6/3883 385/59 |
| 2016/0154185 A1* | 6/2016 | Mori .................... G02B 6/3853 385/56 |
| 2017/0023752 A1* | 1/2017 | Isenhour .............. G02B 6/4293 |
| 2017/0038537 A1* | 2/2017 | Bushnell ............. G02B 6/3817 |

* cited by examiner

ELECTRO-OPTICAL CONNECTORS

BACKGROUND

Computer systems may have components that engage and communicate with one another through mechanical connectors. The mechanical connectors may be conduits for, or enable the transmission of, signals from one computer component to another. The communication signals may be electrical signals or optical signals, for example. Mechanical connectors may need to be properly aligned with each other in order to correctly mechanically engage such that the transmission of signals can occur.

DETAILED DESCRIPTION

Figure 1A:
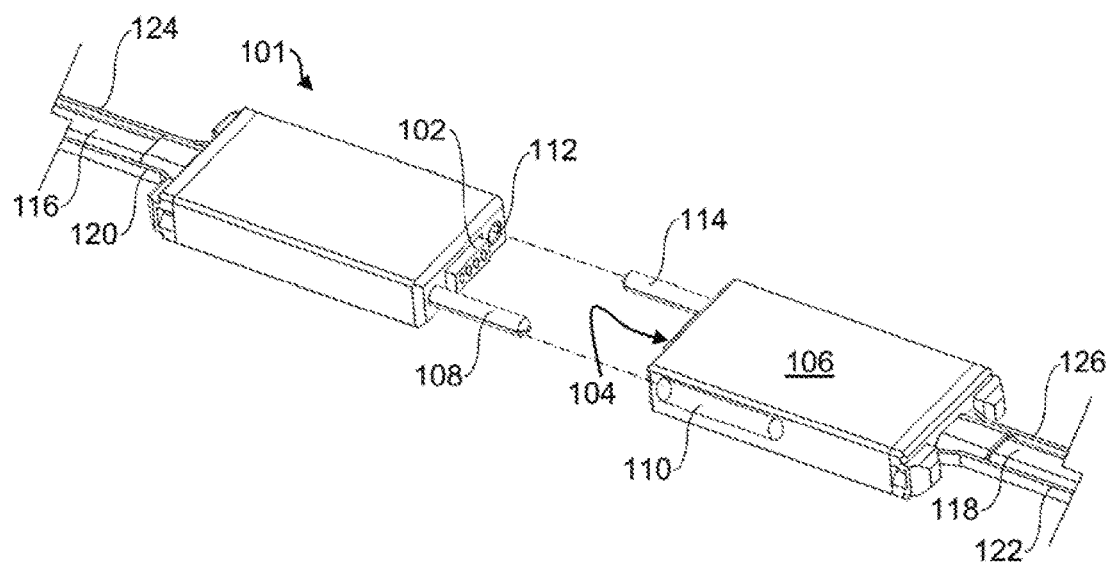
FIG. 1A is a perspective view of an example electro-optical connector system having an example electro-optical connector.

Components of computer systems, including server systems, may engage and communicate with one another through the use of connectors. In some situations, a rack-mount server or blade server may employ connectors in order to engage the server with the other components of the system, or server enclosure. The connectors may be conduits for data or signals to be transmitted from one computer component to another. The signals may include electrical signals, optical signals, or other signals.

In some situations, the connectors may engage with each other through a blind-mate connection. Blind-mate connections may refer to the engagement or mating of connectors without any visual or tactile indications of the proper alignment of the connectors. In some computer systems, components may be inserted into receiving systems, bays, cavities, racks, or trays at an improper angle for alignment of the component's connector with the intended mating connector, because of the blind-mate nature of the connection. Therefore, in such a situation, the connector of the inserted component may be slightly or significantly misaligned with the intended mating connector of the receiving component or system, thereby causing an interference between the connectors, or preventing the proper mating of the connectors. In some situations, however, such an interference due to the misalignment may result in the mating force, or the force causing the attempted mating of the connectors, to shift the position of the inserted computer component until the misalignment is eliminated and the connectors can properly mate.

In some situations, the inserted computer component may be a larger component, such as a server being inserted into a server enclosure, or rack, and the component may include one or more blind-mate connections. The inserted component may still be inserted such that the component's blind-mate connector is misaligned with the intended mating connector in the receiving system or enclosure. Such a misalignment may prevent the connectors from properly mating with one another, and, therefore, may prevent the transmission of data or signals through the connectors from one computer component to another. Moreover, such a misalignment may not correct itself by the shifting of the inserted component, as described above, due to the larger size and/or weight of the inserted component. Such a misalignment may, therefore, result in a failed blind-mating attempt.

Computer components, in some situations, may include guide or alignment features disposed on the connectors of the component. These alignment features may extend outwardly past the electrical, optical, or other signal ferrule of the connector. In a blind-mate connection, the alignment features of the computer component may mechanically engage with complementary alignment features on the intended mating connector in such a way that the mechanical engagement of the alignment features may shift the computer component's connector, or the intended mating connector, until the connectors are properly aligned for mating with each other, and, further, the signal ferrule of each connector is properly aligned with the complementary signal ferrule of the mating connector.

Additionally, in some situations it may be desirable for computer components to communicate with each other through more than one type of signal. It may be desirable for computer components to communicate with each other through electrical, as well as optical signals. In such a situation, communication components such as multiple cables, connectors, and communication ports may be used to carry and transmit the multiple types of signals from one computer component to another. This may increase the amount of space or volume on or within each computer component dedicated to signal transmission and communication, as well as the volume occupied by such communication components. Having additional communication components may also increase the cost of the computer components or system.

Implementations of the present disclosure provide a connector that may transmit multiple types of communication signals. Further, implementations of the present disclosure provide a connector that may include alignment features that may remedy a misalignment between such a connector and a complementary connector. Such alignment features may facilitate the proper alignment of signal ferrules for proper signal transmission. Additionally, implementations of the present disclosure may include alignment features that may transmit a communication signal themselves, in addition to the connector having a signal ferrule for the transmission of another type of communication signal.

Figure 1B:
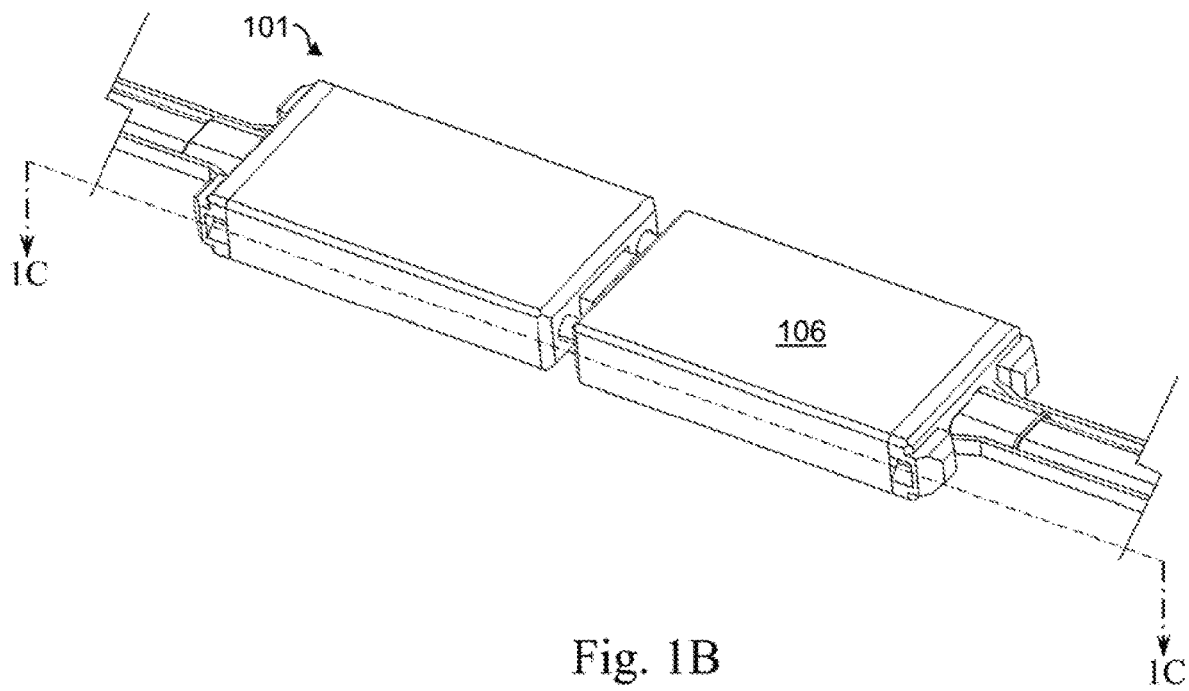
FIG. 1B is a perspective view of an example electro-optical connector system having an example electro-optical connector.
Figure 1C:
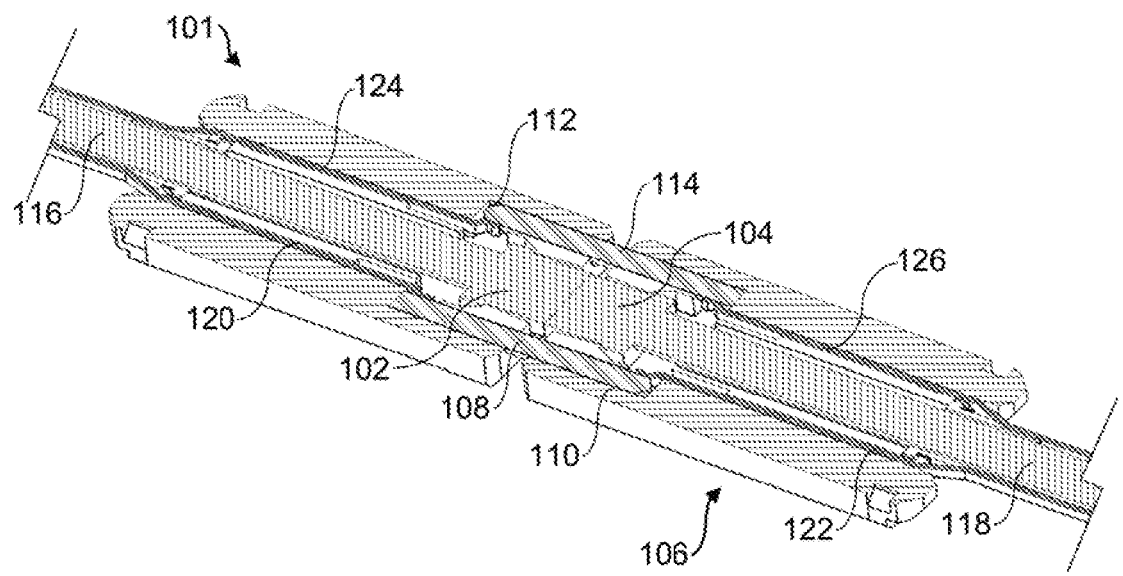
FIG. 1C is a perspective cross-sectional view of an example electro-optical connector system having an example electro-optical connector.

Referring now to FIGS. 1A-C, perspective views of an example electro-optical connector system having an example electro-optical connector 101 is illustrated. FIG. 1A illustrates an example electro-optical connector 101 that is aligned to be engaged with or mated to a complementary electro-optical connector. In some implementations, the example electro-optical connector 101 and the complementary electro-optical connector 106 may be referred to as a first and second electro-optical connector, respectively. FIG. 1B illustrates an example connector 101 engaged with such a complementary connector 106. Further, FIG. 1C illustrates a cross-sectional perspective view of an example electro-optical connector 101 engaged with a complementary connector.

The example electro-optical connector 101 may be engaged with a first electrical device (not shown) and may comprise an optical ferrule 102 to optically engage with a complementary optical ferrule 104 disposed on a complementary electro-optical connector 106. The complementary electro-optical connector 106 may be engaged with a second electrical device (not shown). Further, the example electro-optical connector 101 may comprise a first and second conductive alignment feature 108 and 112, respectively, to mate or engage with a first and second conductive alignment feature 110 and 114 of the complementary electro-optical connector 106. The optical ferrule 102 may comprise mechanical components to transmit and receive signals, such as optical fibers to transmit and receive optical signals, or other components to transmit other data signals. In some implementations, the optical ferrule 102 may include multiple optical fibers to transmit and receive multiple separate optical signals. The optical ferrule 102 may be engaged with the first electrical device such that the optical ferrule 102 may transmit optical signals originating from the first electrical device through optical cable 116. Further the optical cable 116 may transmit optical signals received by the optical ferrule 102 back to the first electrical device. The optical ferrule 102 may be constructed such that it can engage with the complementary optical ferrule 104 on the complementary electro-optical connector 106 in a mechanical fashion, and optically communicate with the complementary ferrule 104. The optical ferrule 104 may be engaged with the second electrical device such that the optical ferrule 104 may transmit optical signals originating from the second electrical device through the optical cable 118. Further the optical cable 118 may transmit optical signals received by the optical ferrule 104 to the second electrical device. In other words, the optical ferrule 102 may engage with the complementary ferrule 104 such that the first electrical device can send optical signals to, and receive optical signals from, the second electrical device via the example electro-optical connector 101, the complementary connector 106, and the optical cables 116 and 118 within them, respectively. Further, the optical ferrule 102 and the optical ferrule 104 may communicate in a bidirectional manner such that the optical ferrule 102 may receive optical signals from the complementary optical ferrule 104, in addition to transmitting them.

The example electro-optical connector 101 may also include a first conductive alignment feature 108. The first conductive alignment feature 108 may be electrically engaged with an electrical contact 120 within the example electro-optical connector 101, such that the first conductive alignment feature can receive an electrical signal or electrical power from the electrical contact 120. In some implementations, the first conductive alignment feature 108 may be a first conductive guide post. The first conductive guide post 108 may comprise a conductive material, such as metal, for example, in some implementations. The first conductive guide post 108 may mechanically and electrically engage with the first conductive alignment feature 110 of the complementary electro-optical connector 106. The first conductive alignment feature 110 may be electrically engaged with an electrical contact 122 within the complementary electro-optical connector 106, such that the first conductive alignment feature 110 can receive an electrical signal or electrical power from the electrical contact 122. In some implementations, the first conductive alignment feature 110 may be a first guide pocket 110. The first guide pocket 110 may be a cavity or pocket disposed within the complementary electro-optical connector 106 and sufficiently sized and structured to receive the first conductive guide post 108. The first guide pocket 110 may be engaged with the electrical contact 122, such that the electrical contact extends partially into the first guide pocket 110. Upon the first guide pocket 110 receiving the first conductive guide post 108, the electrical contact 122 may come into electrical engagement with the first conductive guide post 108. Therefore, in other words, when the guide post 108 is inserted into the guide pocket 110, the guide post 108 may be able to conduct an electrical signal or electrical power from the electrical contact 120 to the electrical contact 122, and vice versa.

The example electro-optical connector 101 may also include a second conductive alignment feature 112. In some implementations, the second conductive alignment feature 112 may be similar in structure or function to the first conductive alignment feature 108. In other implementations, the second conductive alignment feature 112 may have a different structure. The second conductive alignment feature 112 may be electrically engaged with an electrical contact 124 within the example electro-optical connector 101, such that the second conductive alignment feature 112 can receive an electrical signal or electrical power from the electrical contact 124. In some implementations, the second conductive alignment feature 112 may be a second guide pocket 112, which may be similar in structure and function to first guide pocket 110. The second guide pocket 112 may mechanically and electrically engage with the second conductive alignment feature 114 of the complementary electro-optical connector 106. The second conductive alignment feature 114 may be electrically engaged with an electrical contact 126 within the complementary electro-optical connector 106, such that the second conductive alignment feature 114 can receive an electrical signal or electrical power from the electrical contact 126. In some implementations, the second conductive alignment feature 114 may be a second conductive guide post, which may be similar in structure and function to the first conductive guide post 108. Therefore, in other words, when the conductive guide post 114 is inserted into the guide pocket 112, the conductive guide post 114 may be able to conduct an electrical signal or electrical power from the electrical contact 124 to the electrical contact 126, and vice versa.

The electrical contacts 120 and 124 may be an electrical connection between the example electro-optical connector 101 and the first electrical device. Similarly, the electrical contacts 122 and 126 may be an electrical connection between the complementary electro-optical connector 106 and the second electrical device. Therefore the first and second conductive guide posts 108 and 114 may engage with the first and second guide pockets 110 and 112, respectively, such that the conductive guide posts may transmit an electrical signal or electrical power from the first electrical device to the second electrical device, and vice versa.

The first and second conductive guide posts 108 and 114 may engage with the first and second guide pockets 110 and 112, respectively, such that the optical ferrules 102 and 104 are aligned for optical and mechanical engagement. To accomplish this, in some implementations, the first conductive guide post 108 and the second guide pocket 112 may be disposed adjacent to the optical ferrule 102, and on opposite sides of the optical ferrule 102. Thus, when the guide posts are engaged with the respective guide pockets, the electro-optical connector 101 and the complementary electro-optical connector 106 cannot substantially rotate relative to each other along a plane that is perpendicular to the axes of the guide posts. Further, each of the conductive guide posts may extend from the respective electro-optical connector farther than the respective optical ferrule of that electro-optical connector. Thus, as the connectors 101 and 106 are moved towards each other to engage, the conductive guide posts 108 and 114 may engage with the respective guide pockets 110 and 112 prior to the optical ferrules 102 and 104 engaging with each other. This may allow the guide posts 108 and 114 to correct a misalignment of the connectors prior to the attempted engagement of the optical ferrule 102 with the complementary optical ferrule 104 in a blind-mate system. In some implementations, the optical ferrules 102 and 104 may include additional alignment features with higher mechanical tolerances than the conductive alignment features 108, 110, 112 and 114.

Figure 2:
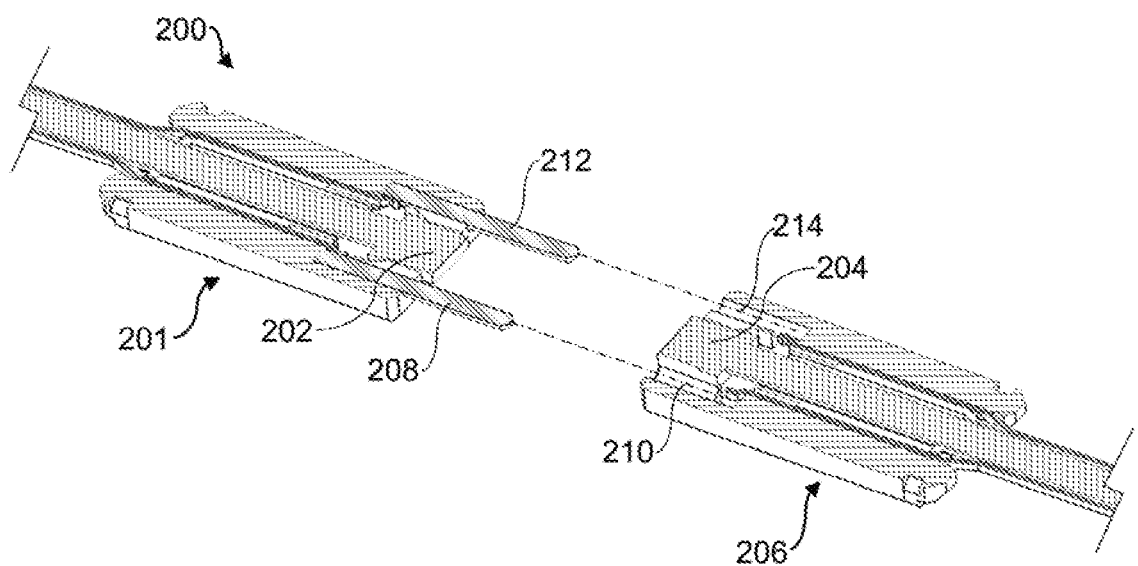
FIG. 2 is a perspective cross-sectional view of an example electro-optical connector system having an example electro-optical connector.

Referring now to FIG. 2, a perspective, cross-sectional view of an example electro-optical connector system 200 is illustrated. Example electro-optical connector system 200 may be similar to example electro-optical connector system 100. Further, the similarly named elements of example electro-optical connector system 200 may be similar in function and/or structure to the elements of example electro-optical connector system 100, as they are described above. The example electro-optical connector system 200 may comprise an electro-optical connector 201 to electrically and optically engage with a complementary electro-optical connector 206, sometimes referred to as first electro-optical connector, and second electro-optical connector, respectively. The first electro-optical connector 201 may comprise a first optical ferrule 202 and a first and second conductive alignment feature 208 and 212, respectively. Similarly, the second electro-optical connector 206 may comprise a second optical ferrule 204 to optically and mechanically engage with the first optical ferrule 202, and a first and second conductive alignment feature 210 and 214 to respectively engage with the first and second conductive alignment features 208 and 212 of the first electro-optical connector 201.

In some implementations, the first and second conductive alignment features 208 and 212 of the first electro-optical connector 201 may be a first and second conductive guide post 208 and 212, respectively. Further, in some implementations, the first and second conductive alignment features 210 and 214 of the second electro-optical connector 206 may be a first and second guide pocket 210 and 214. The first and second guide pocket 210 and 214 may respectively receive the first and second guide posts 208 and 212 in a mechanical and electrical fashion. In further implementations, when engaged with the first and second guide pockets 210 and 214, the first and second conductive guide posts 208 and 212 may align the first and second optical ferrules 202 and 204 for mechanical and optical engagement with one another.

Figure 3A:
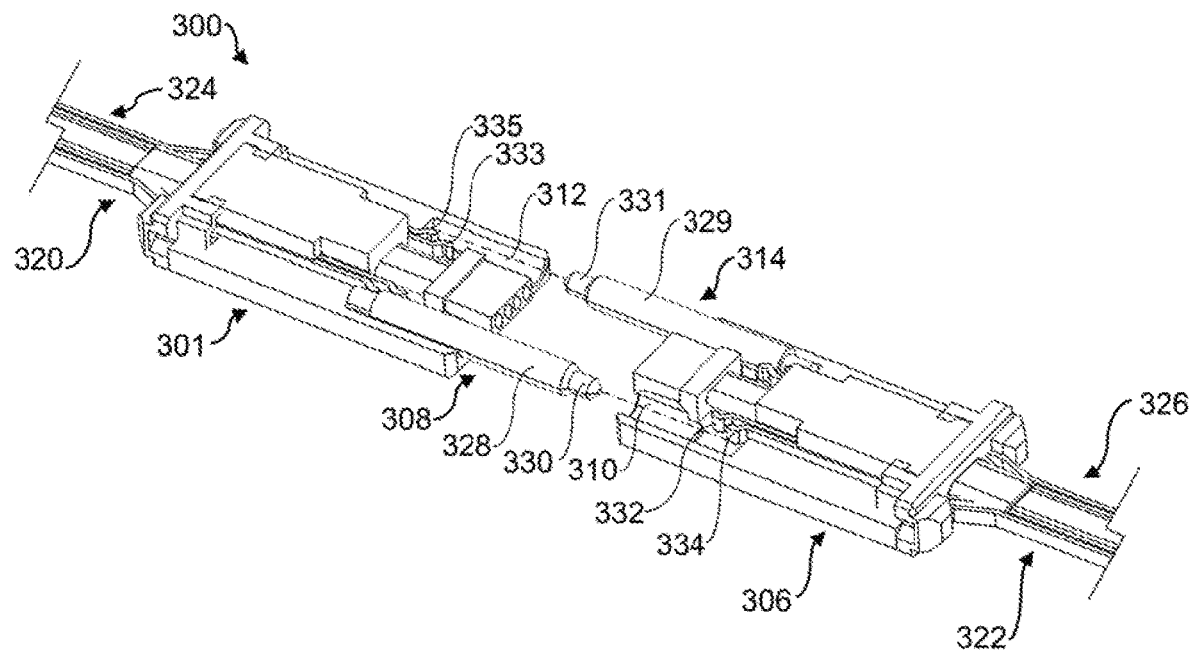
FIG. 3A is a perspective view of an example electro-optical connector system having an example electro-optical connector.
Figure 3B:
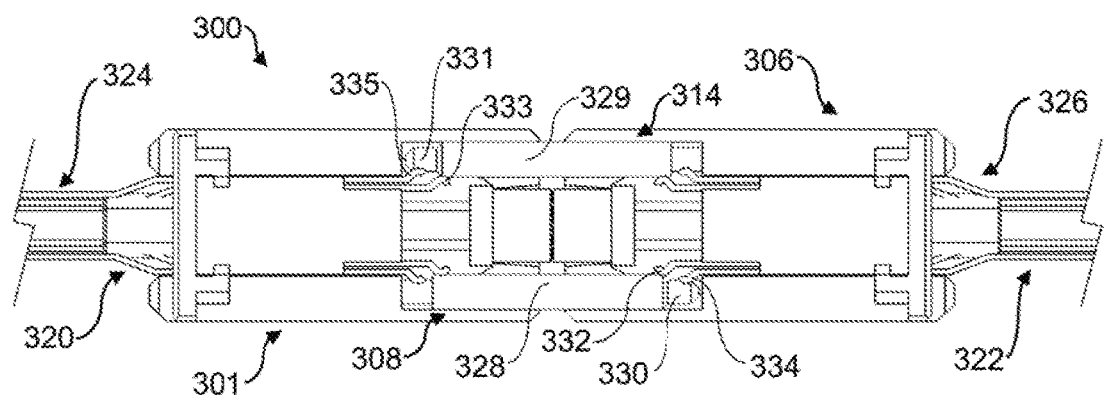
FIG. 3B is a top view of an example electro-optical connector system having an example electro-optical connector.

Referring now to FIGS. 3A-B, a perspective view and a top view of an example electro-optical connector system 300 is illustrated. Example electro-optical connector system 300 may be similar to example electro-optical connector system 100 or 200. Further, the similarly named elements of example electro-optical connector system 300 may be similar in function and/or structure to the elements of example electro-optical connector system 100 or 200, as they are described above. The example electro-optical connector system 300 may comprise a first electro-optical connector 301 to electrically and optically engage with a second electro-optical connector 306. The first electro-optical connector 301 may include a first conductive guide post 308 to engage with a first guide pocket 310 of the second electro-optical connector 306. Similarly, the second electro-optical connector 306 may include a second conductive guide post 314 to engage with a second guide pocket 312 of the first electro-optical connector 301. In some implementations, the first conductive guide post 308 may include a first conductive surface 328, as well as a second conductive surface 330. Similarly, the second conductive guide poste 314 may include a first conductive surface 329 and a second conductive surface 331. The first conductive surfaces 328 and 329 of each of the conductive guide posts, may be electrically insulated from the respective second conductive surfaces 330 and 331, such that the first conductive surface 328, 329 can carry one electrical signal or electrical power, while the second conductive surface 330, 331 may carry a separate electrical signal or electrical power. The first electro-optical connector 301 may be electrically engaged with a first electrical device through electrical wires 320 and 324. Further, the second electro-optical connector 306 may be electrically engaged with a second electrical device through electrical wires 322 and 326. The electrical wires 320 may be able to carry an electrical signal or electrical power to and from the first conductive surface 328 of the first conductive guide post 308. Additionally, the electrical wires 320 may be able to carry a separate electrical signal or electrical power, through a separate electrical conductor within the wires 320, to and from the second conductive surface 330 of the first conductive guide post 308. Similarly, the electrical wires 326 may be able to carry an electrical signal or electrical power to and from the first conductive surface 329 of the second conductive guide post 314. Additionally, the electrical wires 326 may be able to carry a separate electrical signal or electrical power, through a separate electrical conductor within the wires 326, to and from the second conductive surface 331 of the second conductive guide post 314. In some implementations, the first and second conductive surfaces 328 and 330 of the first conductive guide post 308 may each be connected to the wires 320, and separate conductors within, through a separate electrical contact within the first electro-optical connector 301. Similarly, the first and second conductive surfaces 329 and 331 of the second conductive guide post 314 may each be connected to the wires 326, and separate conductors within, through a separate electrical contact within the second electro-optical connector 306.

The first guide pocket 310 may include a first electrical contact 332 as well as a second electrical contact 334. Similarly, the second guide pocket 312 may include a first electrical contact 333 and a second electrical contact 335, as well. The first electrical contact 332, 333 of each guide pocket may electrically engage with the first conductive surface 328, 329 of the respective conductive guide post, when the guide post is engaged with or inserted into the guide pocket. Similarly, the second electrical contact 334, 335 of each guide pocket may, separately from the first electrical contact 332, 333, electrically engage with the second conductive surface 330, 331 of the respective conductive guide post, when the guide post is engaged with or inserted into the guide pocket. The first and second electrical contacts 332 and 334 of the first guide pocket 310 may be electrically engaged with the second electrical device through the wires 322, while the first and second electrical contacts 333 and 335 of the second guide pocket 312 may be electrically engaged with the first electrical device through the electrical wires 324. Therefore, when the first and second electro-optical connectors 301 and 306 are mechanically and electrically engaged with each other, the first and second guide posts 308 and 314 may conduct an electrical signal, as well as a separate electrical power from the first electrical device to the second electrical device, and vice versa. In further implementations, the first and second guide posts 308 and 314 may conduct two separate electrical signals from the first electrical device to the second electrical device and vice versa. In some implementations, the first conductive surface 328, 329 of each of the conductive guide posts is to conduct electrical power to and from, or, in other words, between the first and second electrical devices, while the second conductive surface 330, 331 of each of the conductive guide posts is to conduct an electrical signal, separate from the electrical power, to and from, or, between the first and second electrical devices.

Figure 4:
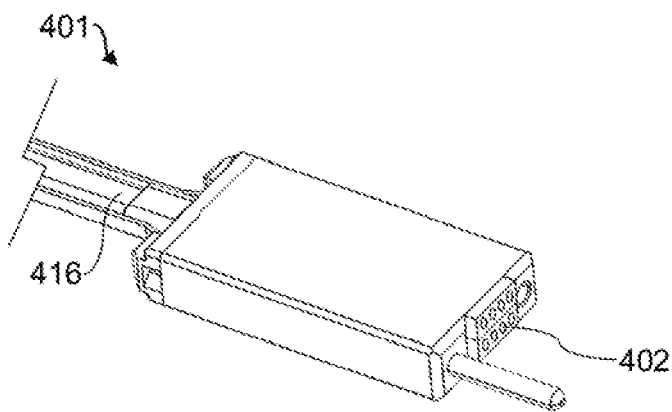
FIG. 4 is a perspective view of an example electro-optical connector.

Referring now to FIG. 4, a perspective view of an example electro-optical connector 401 is illustrated. Electro-optical connector 401 may be similar in function and/or structure to the electro-optical connectors 101, 201, or 301, described above. Further, the elements of electro-optical connector 401 may also be similar in structure and/or function to the similarly-named elements described above. In some implementations, the electro-optical connector 401 may include a plurality of optical ferrules 402 to optically and mechanically engage with a complementary plurality of optical ferrules on a complementary electro-optical connector. In further implementations, each of the plurality of optical ferrules 402 is to transmit a separate optical signal to the respective complementary optical ferrule in the complementary plurality of optical ferrules. In further implementations, the optical ferrules within the plurality of optical ferrules 402 may be oriented in a stacked fashion on top of one another. In yet further implementations, the plurality of optical ferrules 402 may transmit multiple optical signals from a first electrical device, received from optical cable 416, to a complementary electro-optical connector.

Figure 5A:
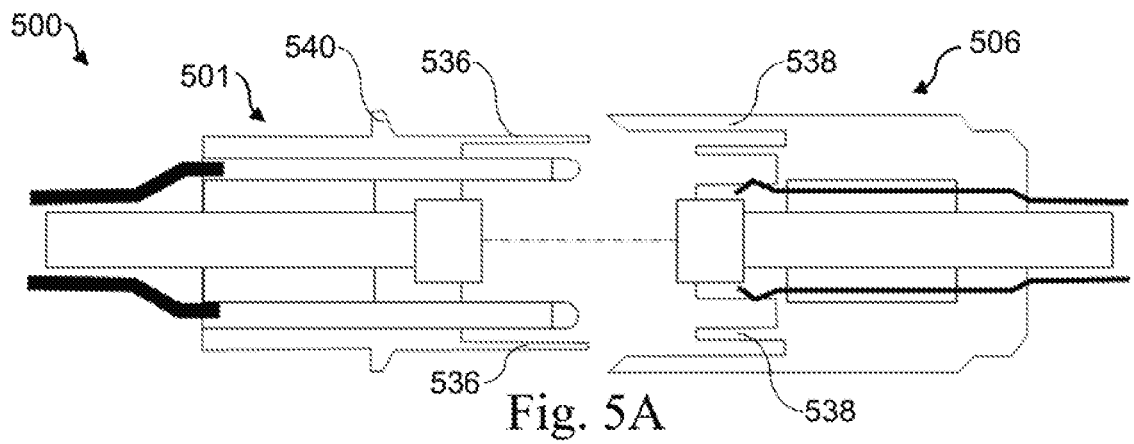
FIG. 5A is a top schematic view of an example electro-optical connector system having an example electro-optical connector.
Figure 5B:
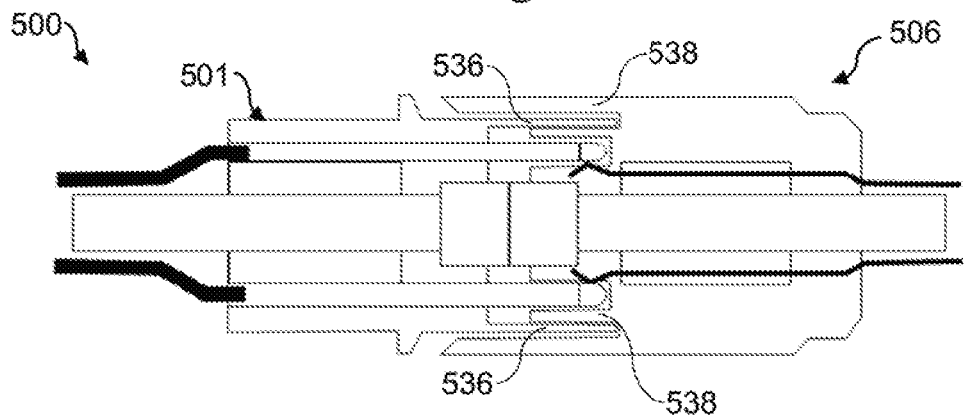
FIG. 5B is a top schematic view of an example electro-optical connector system having an example electro-optical connector.

Referring now to FIGS. 5A-B, top schematic views of an example electro-optical connector system 500 are illustrated. Example electro-optical connector system 500 may be similar to any above-described example electro-optical connector systems. Further, the similarly named elements of example electro-optical connector system 500 may be similar in function and/or structure to the elements of the above-described example electro-optical connector systems. Example electro-optical connector system 500 may include a first electro-optical connector 501 to electrically and optically engage with a second electro-optical connector 506. The first and second electro-optical connectors 501 and 506 may each have first and second alignment features. Additionally, the first electro-optical connector 501 may have supplemental male alignment features 536. Similarly, second electro-optical connector 506 may have supplemental female alignment features 538. In some implementations, the supplemental alignment features 536 and 538 may assist the first and second alignment features of each electro-optical connector in aligning the first and second electro-optical connectors with each other such that the connectors 501 and 506 may be in electrical and optical communication. In further implementations, the supplemental male alignment features 536 may slidably engage with the supplemental female alignment features 538 to assist in aligning the first and second electro-optical connectors 501 and 506.

Figure 6A:
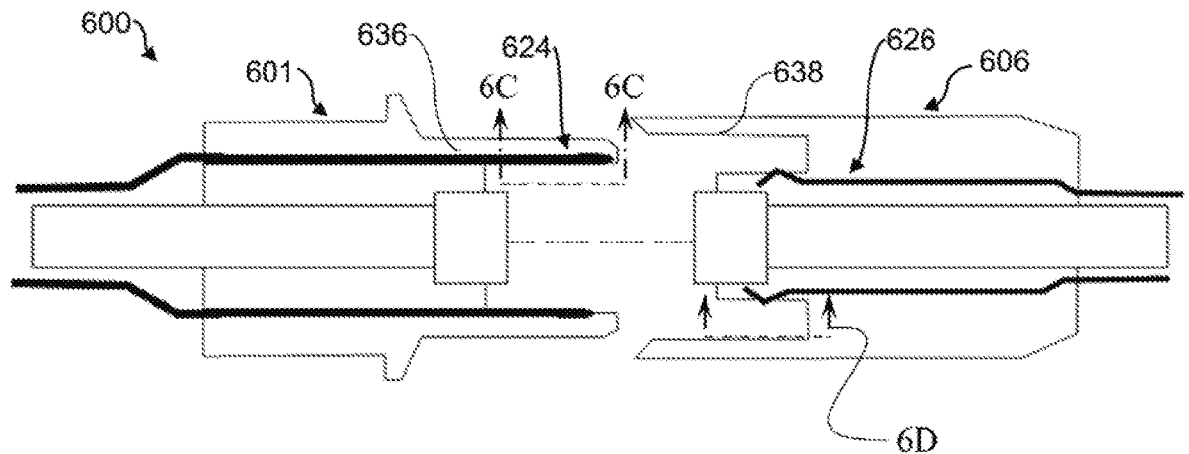
FIG. 6A is a top schematic view of an example electro-optical connector system having an example electro-optical connector.
Figure 6B:
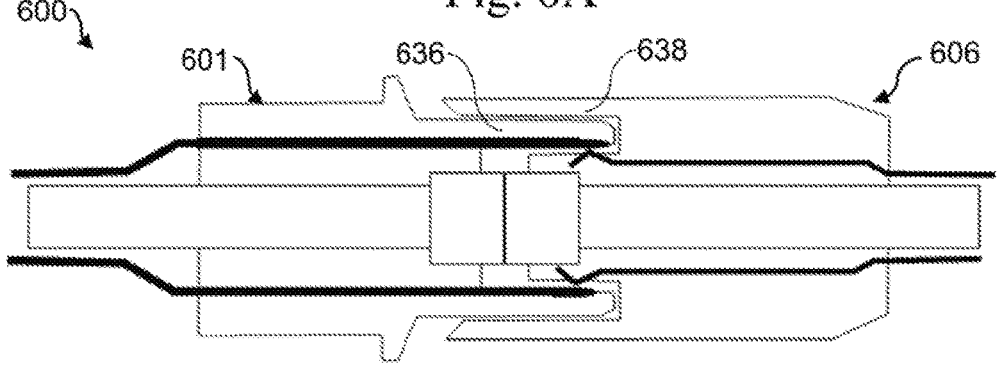
FIG. 6B is a top schematic view of an example electro-optical connector system having an example electro-optical connector.
Figure 6C:
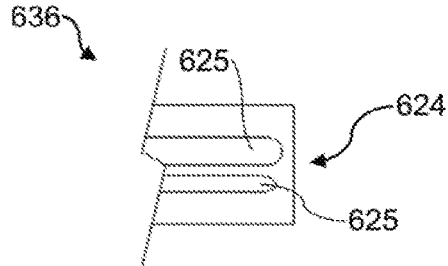
FIG. 6C is a partial detail view of an example electro-optical connector.
Figure 6D:
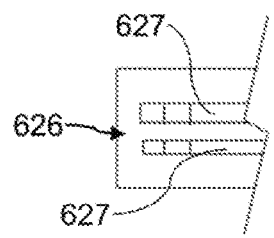
FIG. 6D is a partial detail view of an example electro-optical connector.

Referring now to FIGS. 6A-B, top schematic views of an example electro-optical connector system 600 are illustrated. Example electro-optical connector system 600 may be similar to any above-described example electro-optical connector systems. Further, the similarly named elements of example electro-optical connector system 600 may be similar in function and/or structure to the elements of the above-described example electro-optical connector systems. Example electro-optical connector system 600 may include a first electro-optical connector 601 to electrically and optically engage with a second electro-optical connector 606. Electro-optical connector 601 may include inner alignment features 636. Additionally, second electro-optical connector 606 may include outer alignment features 638 to engage with inner alignment features 636 in an encompassing manner, as is illustrated in FIGS. 6A-B. The engagement of the inner and outer alignment features 636 and 638 may ensure the proper electrical and optical alignment of first electro-optical connector 601 with second electro-optical connector 606. Additionally, first electro-optical connector 601 may include electrical traces 624 to electrically engage with electrical contacts 626 of the second electro-optical connector 606. Referring additionally to FIGS. 6C-D, a partial detail view of the inner alignment feature having the electrical traces 624, as well as a partial detail view of the electrical contacts 626 are illustrated. Electrical traces 624 may include a plurality of conductive traces 625. Similarly, electrical contacts 626 may include a plurality of conductive contacts 627 to each electrically engage with one of the plurality of conductive traces 625 when the first and second electro-optical connectors 601 and 606 are engaged. Thus, electrical traces 624 may be able to conduct multiple separate electrical signals or electrical power to the electrical contacts of electro-optical connector 606, in some implementations.

Figure 7A:
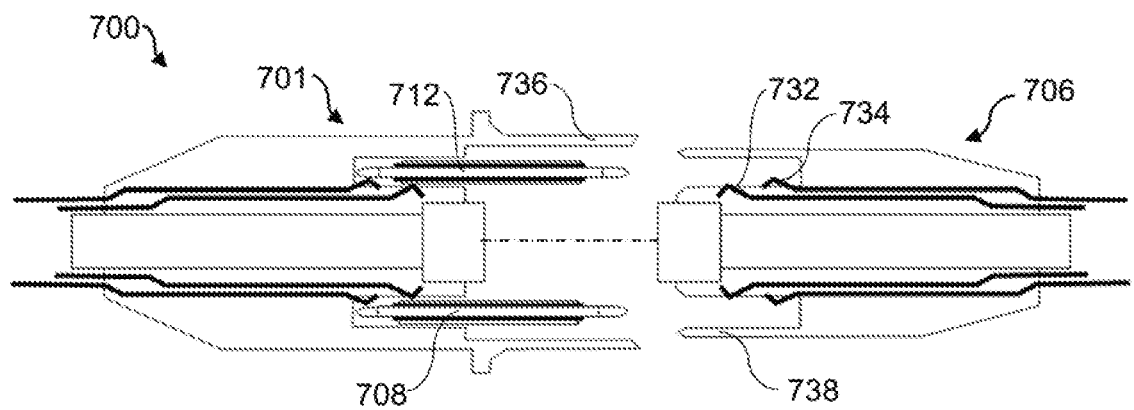
FIG. 7A is a top schematic view of an example electro-optical connector system having an example electro-optical connector.
Figure 7B:
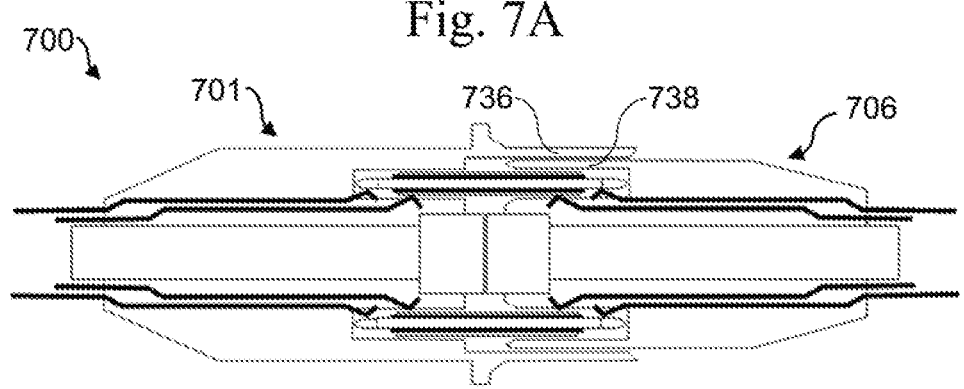
FIG. 7B is a top schematic view of an example electro-optical connector system having an example electro-optical connector.

Referring now to FIGS. 7A-B, top schematic views of an example electro-optical connector system 700 are illustrated. Example electro-optical connector system 700 may be similar to any above-described example electro-optical connector systems. Further, the similarly named elements of example electro-optical connector system 700 may be similar in function and/or structure to the elements of the above-described example electro-optical connector systems. The example electro-optical connector system 700 may include a first electro-optical connector 701 to electrically and optically engage with a second electro-optical connector 706. The first electro-optical connector 701 may include a first and second conductive guide post 708 and 712, respectively, each with a first and second conductive surface. The conductive guide posts may engage with guide pockets of the second electro-optical connector 706 to ensure that the first and second electro-optical connectors 701 and 706 are properly aligned for electrical and optical communication. Each of the guide pockets may have a first electrical contact 732 and a second electrical contact 734 to engage with the first conductive surface and the second conductive surface, respectively, of the guide posts. When engaged, the guide posts may enable the separate transmission of electrical power and an electrical signal, or two separate electrical signals, from the first electro-optical connector 701 to the second electro-optical connector 706, and vice versa. Additionally, the first electro-optical connector 701 may have supplemental alignment features 736 to engage with supplemental alignment features 738 of the second electro-optical connector 706. The engagement of the supplemental alignment features of each connector may further ensure the proper alignment of the connectors for electrical and optical communication.

What is claimed is:

1. An electro-optical connector, comprising:
  an optical ferrule to optically engage with a complementary optical ferrule on a complementary electro-optical connector;
  a first conductive guide post disposed adjacent to the optical ferrule to electrically engage with a first guide pocket of the complementary electro-optical connector; and
  a second conductive guide post disposed on an opposite side of the optical ferrule from the first conductive guide post and to electrically engage with a second guide pocket of the complementary electro-optical connector,
  wherein the first and second conductive guide posts are to align the optical ferrule for engagement with the complementary optical ferrule when the guide posts are engaged with the respective guide pockets,
  wherein the first and second conductive guide posts are to conduct an electrical signal or electrical power from the electro-optical connector to the complementary electro-optical connector, and
  wherein each of the first and second conductive guide posts are to each further include a first and second conductive surface, wherein the first and second conductive surfaces are electrically isolated from each other and are each electrically engaged with a separate electrical contact within the electro-optical connector.

2. The electro-optical connector of claim 1, wherein each of the first and second conductive surfaces of each of the first and second conductive guide posts are to engage with a separate electrical contact within the respective guide pocket within the complementary electro-optical connector, such that the first conductive surface is to conduct electrical power and the second conductive surface is to conduct a separate electrical signal from the electro-optical connector to the complementary electro-optical connector.

3. The electro-optical connector of claim 1, wherein the first and second conductive guide posts are to further conduct an electrical signal or electrical power from the complementary electro-optical connector to the electro-optical connector.

4. The electro-optical connector of claim 1, further comprising a plurality of optical ferrules to optically engage with a complementary plurality of optical ferrules on the complementary electro-optical connector, wherein each of the plurality of optical ferrules is to transmit a separate optical signal to the respective complementary optical ferrule in the complementary plurality of optical ferrules.

5. An electro-optical connector, comprising:
  an optical ferrule to optically engage with a complementary optical ferrule on a complementary electro-optical connector;
  a first conductive guide post disposed adjacent to the optical ferrule to electrically engage with a first guide pocket of the complementary electro-optical connector; and
  a second guide pocket disposed on an opposite side of the optical ferrule from the first conductive guide post to electrically engage with a second conductive guide post of the complementary electro-optical connector;
  wherein the first and second conductive guide posts are to align the optical ferrule for engagement with the complementary optical ferrule when the guide posts are engaged with the respective guide pockets,
  wherein the first and second conductive guide posts are to conduct an electrical signal or electrical power from the electro-optical connector to the complementary electro-optical connector,
  wherein each of the first and second conductive guide posts are to each further include a first and second conductive surface,
  wherein the first and second conductive surfaces are electrically isolated from each other,
  wherein the first and second conductive surfaces of the first conductive guide post are each electrically engaged with a separate electrical contact within the electro-optical connector, and
  wherein the second guide pocket includes a first and second electrical contact to separately electrically engage with the first and second conductive surfaces of the second conductive guide post, such that the first conductive surface of the second conductive guide post is to conduct electrical power and the second conductive surface of the second conductive guide post is to conduct a separate electrical signal from the electro-optical connector to the complementary electro-optical connector.

6. The electro-optical connector of claim 5, wherein each of the first and second conductive surfaces of the first conductive guide post is to engage with a separate electrical contact within the first guide pocket within the complementary electro-optical connector, such that the first conductive surface of the first conductive guide post is to conduct electrical power and second conductive surface of the first conductive guide post is to conduct a separate electrical signal from the electro-optical connector to the complementary electro-optical connector.

7. The electro-optical connector of claim 5, further comprising a plurality of optical ferrules to optically engage with a complementary plurality of optical ferrules on the complementary electro-optical connector, wherein each of the plurality of optical ferrules is to transmit a separate optical signal to the respective complementary optical ferrule in the complementary plurality of optical ferrules.

8. The electro-optical connector of claim 5, wherein the first and second conductive guide posts are to further conduct an electrical signal or electrical power from the complementary electro-optical connector to the electro-optical connector.

9. An electro-optical connector system, comprising:
  a first electro-optical connector engaged with a first electrical device, including:

a first optical ferrule; and a first and second conductive alignment feature;

wherein the first and second conductive alignment features are electrically engaged with the first electrical device; and a second electro-optical connector engaged with a second electrical device, including:

a second optical ferrule that is complementary to the first optical ferrule, such that the first and second optical ferrules can optically and mechanically engage with one another; and a first and second conductive alignment feature to mechanically and electrically engage with the first and second conductive alignment features of the first electro-optical connector, respectively wherein the first and second optical ferrules are aligned for optical and mechanical engagement when the first and second conductive alignment features of the first electro-optical connector are mechanically engaged with the first and second conductive alignment features of the second electro-optical connector, wherein the first conductive alignment feature of the first electro-optical connector is a conductive guide post and the first conductive alignment feature of the second electro-optical connector is a guide pocket to receive the guide post of the first electro-optical connector, and wherein the second conductive alignment feature of the second electro-optical connector is a conductive guide post and the second conductive alignment feature of the first electro-optical connector is a guide pocket to receive the guide post of the second electro-optical connector, and wherein each of the conductive guide posts includes a first and second conductive surface, wherein the first conductive surfaces of the conductive guide posts are to conduct electrical power to and from the first electrical device to and from the second electrical device, and wherein the second conductive surfaces of the conductive guide posts are to conduct a separate electrical signal to and from the first electrical device to and from the second electrical device.

* * * * *